No. 859,780. PATENTED JULY 9, 1907.
R. A. RODESCH.
GOVERNOR.
APPLICATION FILED JULY 30, 1906.

Attest:
John Enders
Henry Moe

Inventor:
Robert A. Rodesch,
by Robert Burns
Attorney

ID="L1"
UNITED STATES PATENT OFFICE.

ROBERT A. RODESCH, OF DIXON, ILLINOIS.

GOVERNOR.

No. 859,780.  Specification of Letters Patent.  Patented July 9, 1907.

Application filed July 30, 1906. Serial No. 328,405.

*To all whom it may concern:*

Be it known that I, ROBERT A. RODESCH, a citizen of the United States of America, and a resident of Dixon, in the county of Lee and State of Illinois, have invented a certain new and useful Improvement in Governors, of which the following is a specification.

This invention relates more especially to governors for spring motors of automatic piano players, and the like, and in which a friction disk mounted on the governor shaft is engaged by a manually adjustable brake to regulate the speed of the motor; and the present improvement has for its object to provide a simple and efficient structural formation and combination of the weighted arm, friction disk and other parts of the governor in immediate relation therewith, whereby a very sensitive regulation of the speed of the motor is attained, all as will hereinafter more fully appear.

Figure 1:
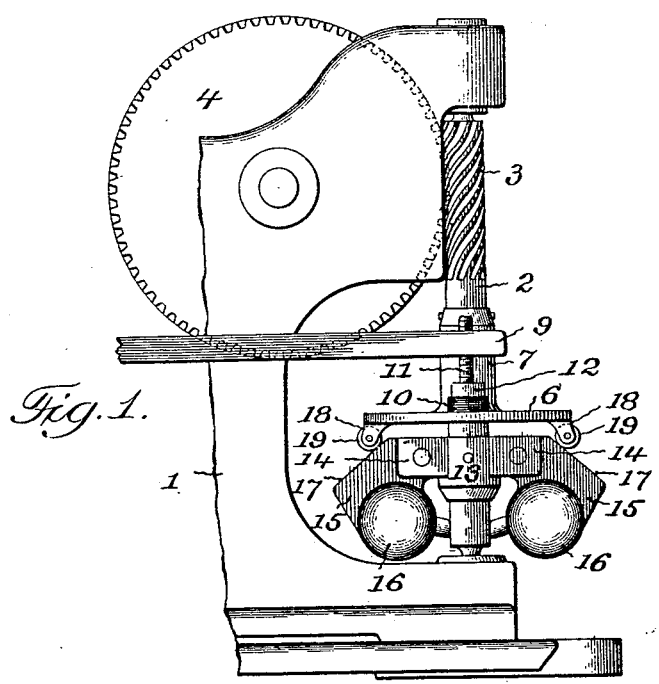
Figure 2:
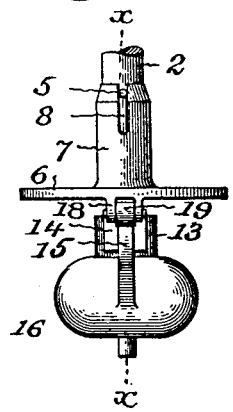
Figure 3:
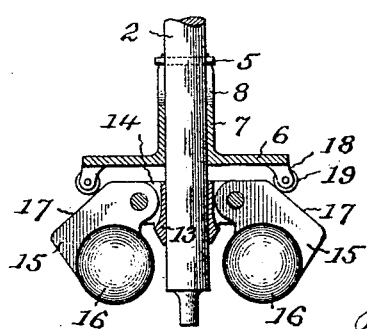
Figure 4:
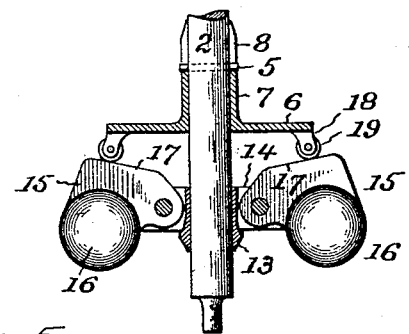
Figure 5:
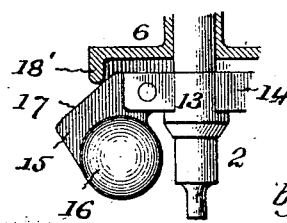

In the accompanying drawings:—Figure 1 is a side elevation of the governor portion of a spring motor having the present improvement applied. Fig. 2 is a detail end elevation of the same. Figs. 3 and 4 are detail vertical sections on line x—x, Fig. 2 showing the two extreme positions of the governor mechanism. Fig. 5 is a detail vertical section of a modification.

Similar numerals of reference indicate like parts in the several views.

Referring to the drawings, 1 represents the stationary supporting frame formed with suitable bearings for the support of the governor mechanism.

2 is the governor shaft journaled in the frame 1, and having near one end a quick pitch spiral gear 3, or the like, for operative engagement with a correspondingly formed driving gear 4, also journaled in the frame 1, aforesaid. Such shaft also carries lateral pins or studs 5, for the purpose hereinafter stated.

6 is a friction disk sliding upon the governor shaft 2, by means of a central hub or collar 7, and connected thereto against independent rotation by one or more elongated slots 8, engaging the lateral pins or studs 5 of the governor shaft, as shown.

9 is the usual manually actuated brake lever to which the brake shoe of the governor is attached.

10 is the brake shoe, preferably formed of a disk of leather or other analogous material, and carried by an adjustable screw stem 11 screwing into one end of the brake lever 9, aforesaid; such stem is provided with a head or enlargement for the attachment of the brake shoe 10, aforesaid.

13 is a hub secured to the governor shaft 2 in adjacent relation to the friction disk aforesaid, and provided with the usual side ears 14 for the pivotal attachment of the governor arms 15, carrying the governor weights or balls 16. In the present improvement, each governor arm 15 is of the approximately triangular form shown in the drawings, and near one corner is pivotally connected to the pivot ears 14, aforesaid; at another corner, adjacent to the governor shaft, the governor weights 16 are attached, while the straight surface 17, between the free corner of the arm end and the aforesaid corner where pivotal attachment is had, is adapted to have operative engagement beneath the friction disk 6, in manner hereinafter described, to force said disk against the brake shoe 10, in the normal operation of the governor.

18 are bearing lugs or beads on the under-side of the friction disk 6, adapted to have bearing engagement against the straight surfaces 17 aforesaid of the governor arms. It is however preferable to employ rollers 19 at such contact points with a view to avoid friction and render the action of the parts more sensitive and uniform. In Fig. 5 such bearing lugs are shown as integral with the disk and in the form of a down-turned flange 18', and having direct bearing against the straight surfaces 15, aforesaid, of the governor arms. In Figs. 1, 2, 3 and 4 the preferred arrangement of interposed bearing rollers 19, is shown.

Having thus fully described my said invention, what I claim as new and desire to secure by Letters Patent is:—

1. In a centrifugal governor, the combination of a governor shaft, a friction disk rotating with said shaft and adapted to have sliding movement thereon, a manually actuated brake lever carrying a brake shoe adapted for engagement with said disk, governor weights and governor arms, each governor arm having a substantially triangular form and pivotally attached near one corner to the governor shaft, and carrying a governor weight at another corner, with a straight side removed from said governor weight adapted for operative engagement with the friction disk.

2. In a centrifugal governor, the combination of a governor shaft, a friction disk rotating with said shaft and adapted to have sliding movement thereon, a manually actuated brake lever carrying a brake shoe adapted for engagement with said disk, governor weights and governor arms, each governor arm having a substantially triangular form and pivotally attached near one corner to the governor shaft, and carrying a governor weight at another corner, with a straight side removed from said governor weight adapted for operative engagement with the friction disk, the said disk carrying rollers for bearing engagement with the straight sides of the governor arms.

Signed at Chicago, Illinois, this 27th day of July 1906.

ROBERT A. RODESCH.

Witnesses:
 ROBERT BURNS,
 HENRY MOE.